United States Patent [19]

Leemkuil

[11] Patent Number: 5,191,959
[45] Date of Patent: Mar. 9, 1993

[54] SORTING CONVEYOR WITH VERTICAL SWITCHING SYSTEM

[75] Inventor: Hendrik Leemkuil, Pickerington, Ohio

[73] Assignee: Alvey Inc., St. Louis, Mo.

[21] Appl. No.: 896,374

[22] Filed: Jun. 10, 1992

[51] Int. Cl.5 ............................................. B65G 47/46
[52] U.S. Cl. ..................................... 198/365; 198/372; 198/802
[58] Field of Search ............... 198/365, 370, 372, 440, 198/456, 802

[56] References Cited

U.S. PATENT DOCUMENTS

| | | | |
|---|---|---|---|
| 3,277,995 | 10/1966 | Seed | 198/802 |
| 3,986,596 | 10/1976 | Hamilton | 148/365 |
| 4,637,508 | 1/1987 | Kikuchi et al. | 198/365 |
| 4,760,908 | 8/1988 | Houghton | 198/365 |
| 4,884,677 | 12/1989 | Yu et al. | 198/365 X |
| 4,890,724 | 1/1990 | Loewenthal | 198/802 X |
| 4,896,760 | 1/1990 | Triantafilou et al. | 198/365 |
| 4,941,561 | 7/1990 | Yamabe et al. | 198/365 |
| 4,984,675 | 1/1991 | Yamabe et al. | 198/365 |
| 5,027,939 | 7/1991 | Kilper et al. | 198/365 |

Primary Examiner—Robert P. Olszewski
Assistant Examiner—James R. Bidwell
Attorney, Agent, or Firm—Jacox & Meckstroth

[57] ABSTRACT

An article sorting conveyor includes an endless flexible carrier having a series of longitudinally spaced cross slats or tubes supporting article transfer pushers for lateral movement on the carrier relative to the direction of movement of the carrier. Each pusher has a vertically movable shaft which carries a follower or roller for selectively engaging an upper linear track or a lower curved or diverting track. Each shaft is releasably retained in an upper retracted position where the corresponding roller engages the upper track and is spring biased to a lower extended position where the roller engages the lower track. A controllable actuator is positioned ahead of each diverting station along the conveyor to release a series of selected shafts and rollers, and an inclined ramp at the end of the conveyor successively shifts the shafts and rollers from their lower extended positions back to their upper retracted positions.

15 Claims, 2 Drawing Sheets

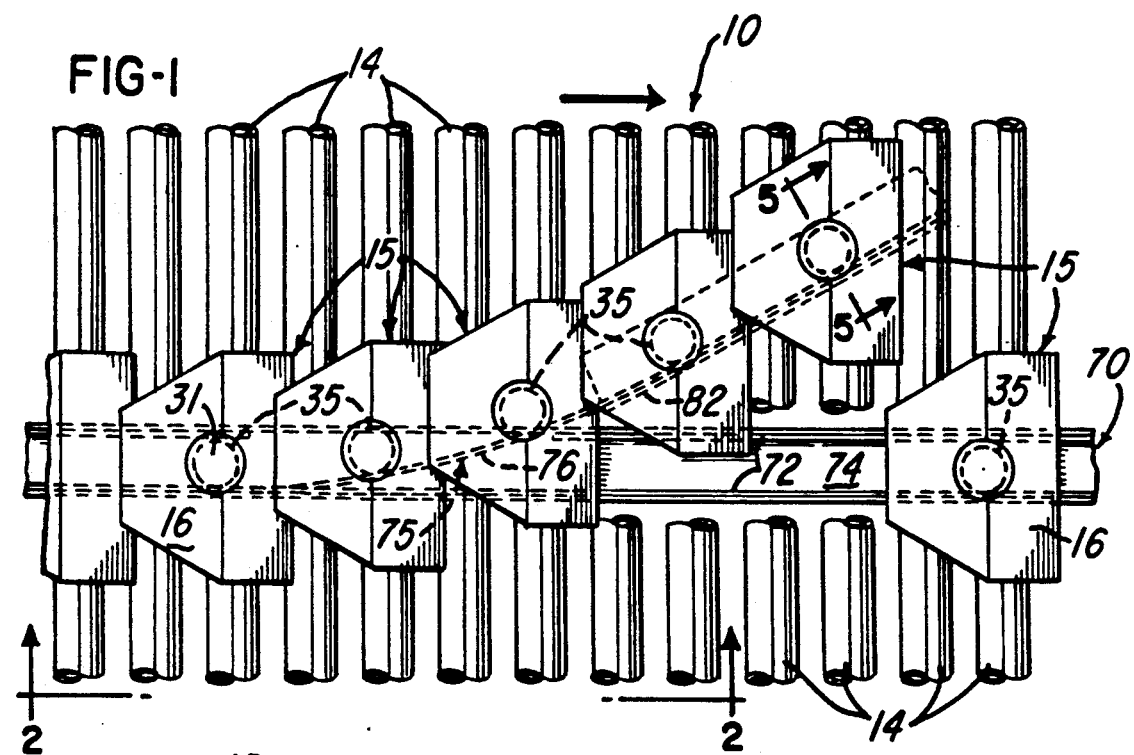
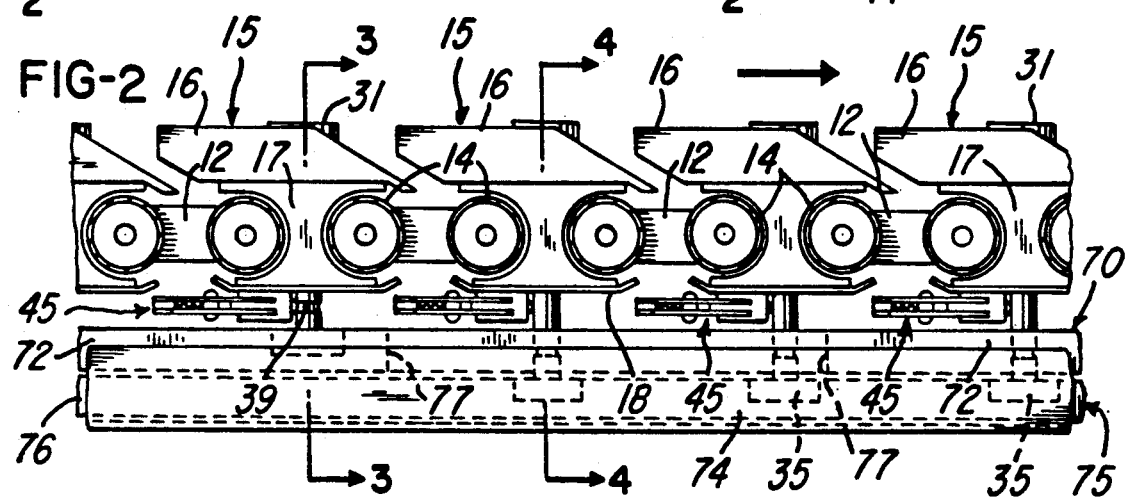
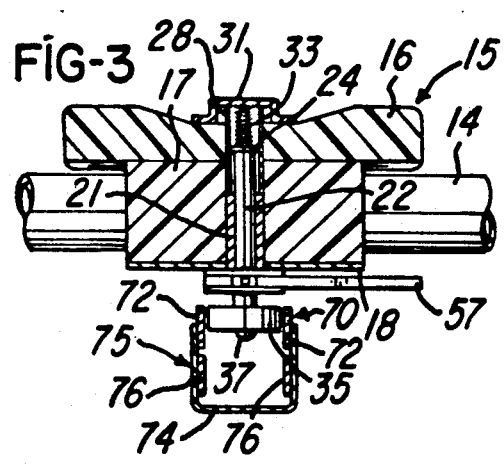
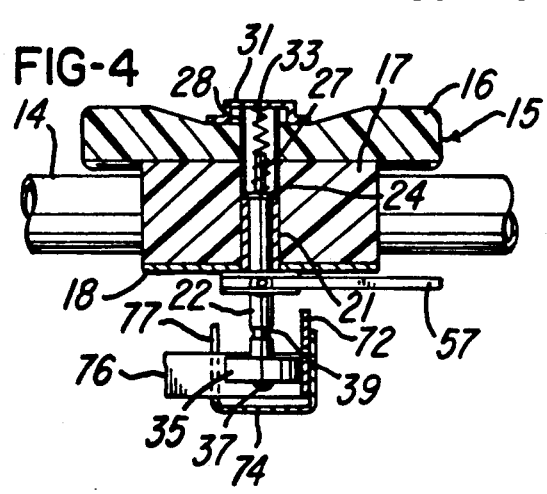

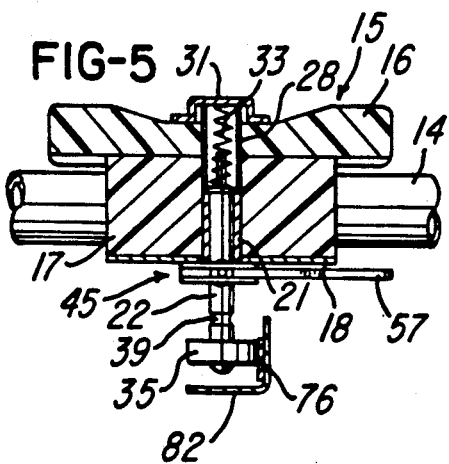
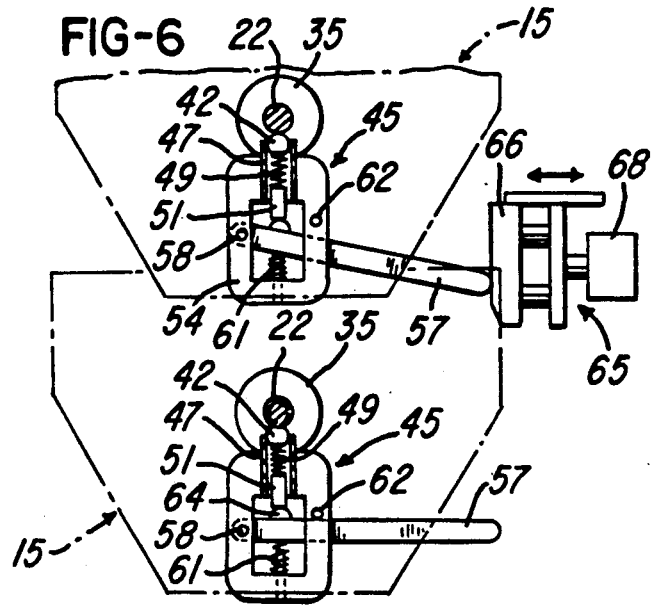
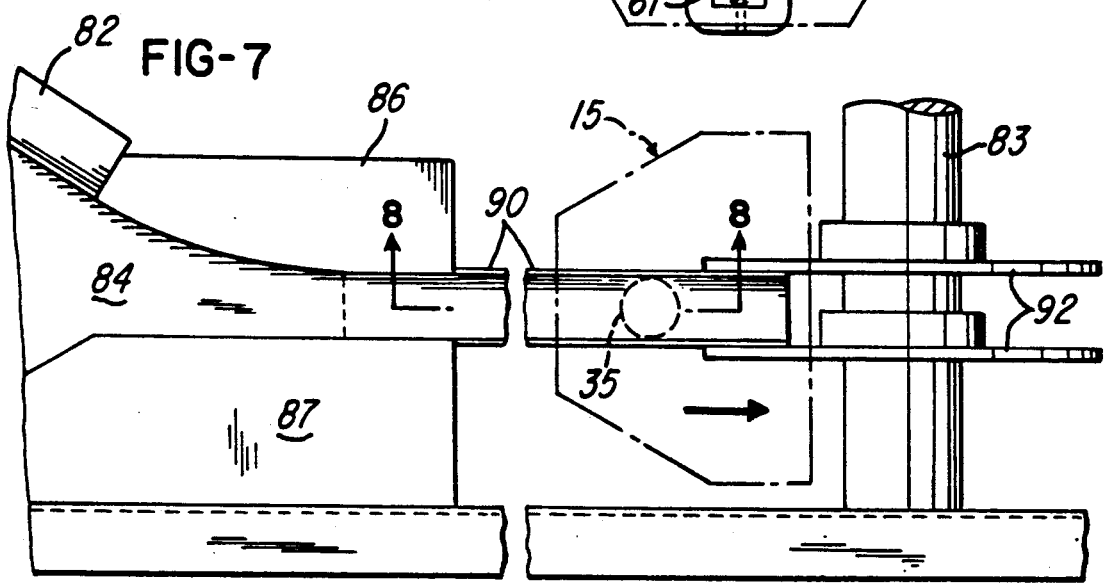
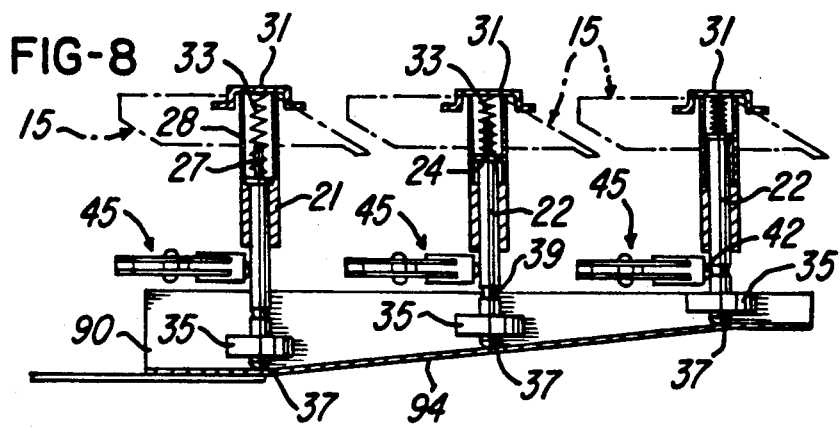

SORTING CONVEYOR WITH VERTICAL SWITCHING SYSTEM

BACKGROUND OF THE INVENTION

In a package or article sorting conveyor, for example, of the type disclosed in U.S. Pat. No. 5,027,939 which issued to the assignee of the present invention, an elongated frame supports an endless flexible apron or carrier which includes a pair of parallel spaced endless chains connected by parallel spaced cross slats or tubes. A series of article transfer units or pushers are supported by adjacent pairs of the cross tubes for lateral sliding movement between the drive chains of the carrier. Each of the pushers on the top run of the carrier includes a downwardly projecting shaft which carries one or more followers or rollers for engaging a track system supported within the frame and including a set of switch blocks.

Each of the switch blocks is supported for pivotal movement on a vertical axis and is pivoted by a remotely controllable actuator in the form of a fluid cylinder or solenoid. When it is desired to move a series of pushers laterally on their supporting cross slats or tubes for shifting a package or article transversely across the carrier to a receiving bin or spur conveyor, a switch block is pivoted to direct the rollers of the pushers along a track which extends transversely across the width of the endless carrier.

As apparent from the above mentioned U.S. Pat. No. 5,027,939, when a switch block is pivoted for diverting a series of pushers, there is an abrupt change in the direction of movement of each pusher as its corresponding roller passes through the switch block. This requires that the pivoting of the switch block be rapid and precisely timed with the movement of the endless carrier. It is also desirable for the switching system to be constructed for minimizing noise and wear on the switching and diverting system, all of which become more of a problem with higher speed operation of the conveyor.

SUMMARY OF THE INVENTION

The present invention is directed to an endless conveyor system for transporting and sorting packages and other articles and which incorporates an improved switching system for diverting one or more packages or articles laterally across the endless conveyor to a receiving bin or spur conveyor. The switching system of the invention provides for significantly increasing the operational speed of the conveyor, for example, from 450 feet per minute to 650 feet per minute while also providing for more dependable and quieter operation of the conveyor and for minimizing wear on the switching and diverting components of the conveyor.

In accordance with one embodiment of the invention, an article sorting conveyor includes an endless flexible carrier having longitudinally spaced cross slats or tubes which support a series of article transfer units or pushers for lateral sliding movement between opposite sides of the carrier. Each transfer unit or pusher carries a vertically movable shaft which supports a roller for vertical movement between an upper retracted position and a lower extended position. The shaft and roller of each pusher are releasably retained in their upper retracted position for engaging a linear guide track extending parallel to the direction of movement of the carrier.

When the shaft and roller of each pusher on the upper run of the conveyor are released by a remotely controllable actuator located upstream of each diverting station, the shaft and roller are urged downwardly by a compression spring within the pusher. As a result, the roller drops into or engages a lower track which extends below the upper track and then curves gradually away from the upper track to extend transversely across the width of the conveyor. An inclined ramp is located at the end of the conveyor for successively moving or shifting the shafts and rollers on the pushers back to their upper retracted positions for performing another cycle or sortation as the articles are transferred down the upper horizontal run of the endless carrier.

Other features and advantages of the invention will be apparent from the following description, the accompanying drawings and the appended claims.

BRIEF DESCRIPTION OF THE DRAWINGS

FIG. 1 is a fragmentary plan view of a section of an endless carrier of a sorting conveyor and illustrating the diverting of a series of transfer or pushers by a switching system constructed in accordance with the invention;

FIG. 2 is a fragmentary elevational view of the conveyor section and taken generally on the line 2—2 of FIG. 1;

FIG. 3 is a fragmentary section taken generally on the line 3—3 of FIG. 2;

FIG. 4 is a fragmentary section taken generally on the line 4—4 of FIG. 2;

FIG. 5 is a fragmentary section taken generally on the line 5—5 of FIG. 1;

FIG. 6 is a plan view, in part section, of two of the retaining latches shown in FIGS. 2 and 3 and carried by corresponding pushers shown in phantom;

FIG. 7 is a fragmentary plan view of an end portion of the conveyor and showing the ramp system for resetting each of the pushers on the endless carrier for another cycle of operation; and FIG. 8 is a fragmentary section taken generally on the line 8—8 of FIG. 7 and showing the resetting of a series of pushers.

DESCRIPTION OF THE PREFERRED EMBODIMENT

Referring to FIG. 1, a sorting conveyor is constructed substantially the same as the sorting conveyor disclosed in U.S. Pat. No. 5,027,939, the disclosure of which is incorporated by reference. The conveyor includes a frame (not shown) which supports an endless apron or carrier 10 formed by a pair of parallel spaced endless chains 12 (FIG. 2) connected by longitudinally spaced parallel spaced cross slats or tubes 14, as shown in the above-mentioned patent. A series of article transfer units or pushers 15 each includes a head portion 16 mounted on a base portion 17 which carries a bottom plate 18. The portions 16 and 17 are preferably molded of a plastics material, and the base portion 17 is slidably supported by an adjacent pair of cross tubes 14 so that each pusher is movable laterally along its support tubes 14 and between the endless chains of the carrier 10. The construction of the frame and tracks which slidably supports the endless chains and the drive for the chains, is preferably the same as described in above-mentioned U.S. Pat. No. 5,027,939.

In accordance with the present invention, each of the transfer units or pushers 15 includes a vertical cylindrical bushing 21 which extends through the base portion 17 and guides a vertically movable pin or shaft 22. A washer 24 is secured to the upper end of each shaft 22 by a stud 27, and the washer 24 is guided within an aligned sleeve 28 within the head portion 16 and having an inner diameter slightly larger than inner diameter of the bushing 21. The shaft 22 is movable between an upper retracted position (FIG. 3) when the stud 27 approaches a cap 31 secured to the head portion 16 of the pusher 15 and a lower extended position (FIG. 4) when the washer 24 engages the upper end of the bushing 21. A compression spring 33 is mounted on the stud 27 and engages the cap 31 for normally urging the shaft 22 to its lower extended position, as shown in FIG. 4.

A follower in the form of an anti-friction bearing or roller 35 is mounted on the lower end of the shaft 22 of each pusher 15 by a low friction plastic stud 37, and a circumferential groove 39 (FIG. 4) is formed within each shaft 22 above the roller 35. The shaft 22 and roller 35 are normally retained in their upper retracted position (FIG. 3) by a detent ball 42 (FIG. 6) forming part of a releasable latch unit 45 mounted on the bottom plate 18. Each latch unit 45 includes a tube 47 which retains the ball 42 and encloses a compression spring 49 extending between the ball 42 and a cylindrical stud 51 also confined within the tube 47. The tube 47 is supported by a pair of vertically spaced frame-like plates 54 which are secured by screws to the base portion 18 of the corresponding pusher 15.

A release lever 57 (FIG. 6) is pivotally supported by a pin 58 connecting the plates 54, and a compression spring 61 normally urges the lever 57 against a stop pin 62 which also connects the plates 54. The lever 57 has a pad 64 which engages the stud 51 so that each latch unit 45 is normally in the position shown by the lower portion of FIG. 6 for releasably retaining the shaft 22 and roller 35 in their upper retracted positions, as shown in FIG. 3. A series of remotely controllable actuators 65 are located along the length of the conveyor, one for each zone where diverting is desired. Each of the actuators 65 includes a laterally movable cam block 66 connected to be moved by a solenoid or fluid cylinder 68.

Referring to FIG. 3, when the shaft 22 of each pusher unit 15 is in its upper retracted position, the corresponding roller 35 is guided by an upper linear track 70 formed by a pair of parallel spaced wear strips 72 supported by the upper leg portions of a U-shaped support channel 74. The upper track 70 and the support channel 74 extend substantially the full length of the conveyor except in the zones or at the stations where it is desired to divert a series of pushers 15 laterally for shifting an article to a receiving bin or spur conveyor. The channel 74 also supports a lower track 75 also formed by a lower pair of parallel spaced wear strips 76.

Referring to FIGS. 1 and 4, wherever along the length of the conveyor it is desired to provide for the movement of the pushers 15 laterally for diverting one or more packages or articles, the left leg portion of the channel 74 (FIG. 4) and the corresponding portions of the track strips 72 and 76 are removed to form a gap or opening 77 within the support channel 74. As shown in FIG. 1, the lower right track strip 76 curves outwardly through the opening 77 so that any roller 35 in its lower extended position is diverted laterally to move the corresponding pusher 15 laterally on its support tubes 14. As shown in FIGS. 1 & 5, after the lower right track strip 76 is extended through the opening 77, it is supported by an angular track 82 which extends transversely across the width of the carrier 10 so that the corresponding pusher 15 is shifted to the opposite side of the carrier 10 as the cross tubes 14 advance along the upper run.

At the head end of the sorting conveyor, the endless chains connecting the tubes 14 are directed around corresponding sprockets mounted on a cross shaft 83 (FIG. 7). The diverting angle track 82 extends back to the opposite side of the carrier 10 to bring all of the rollers 35 and corresponding pushers 15 back into a converging passage or channel 84 (FIG. 7) defined between spaced guide blocks 86 and 87 supported by the conveyor frame. A U-shaped guide channel 90 extends from the blocks 86 and 87 to a space defined between a pair of axially spaced circular disks 92 (FIG. 7) mounted on the cross shaft 83 for rotation with the shaft. As shown in FIG. 8, the guide channel 90 has an inclined bottom wall 94 which forms a ramp for successively camming or shifting the shafts 22 and rollers 35 of the pushers 15 from their lower extended positions to their upper retracted positions where each of the shafts 22 is retained by its corresponding latch unit 45. The pushers 15 then engage the guide disks 92 (FIG. 7) which direct the pushers to the lower run of the conveyor.

From the drawings and the above description, it is apparent that a sorting conveyor incorporating a switching system constructed in accordance with the invention provides desirable features and advantages. For example, as shown on FIGS. 1–4, when it is desired to divert a series of pushers 15 for shifting a package or article to a spur conveyor at the side of the carrier 10, the followers or rollers 35 of the pushers 15 are released to shift downwardly from the upper track 70 to the lower track 75 by operation of the corresponding latches 45 with the actuator 65. As apparent from FIG. 1, this shifting of the rollers 35 may be performed upstream by several feet of the zone where the track 76 begins to curve laterally through the opening 77. As a result, the lower track 76 may be provided with a gradual curve or change in direction (FIG. 1) and thereby eliminate any abrupt change in the direction of movement of each pusher 15. Not only does this permit the conveyor to be operated at a higher speed, the gradual change in direction of the lower track 76 and the pushers 15 provides for a quieter and more dependable operation of the conveyor carrier 10. The channel 90 (FIGS. 7 & 8) also provides for gradually shifting each of the extended followers or rollers 35 and its supporting shaft 22 from their lower or extended positions to their upper or retracted positions where the shaft 22 is retained by the latch unit 45 carried by the corresponding pusher 15.

While the form of conveyor apparatus herein described constitutes a preferred embodiment of the invention, it is to be understood that the invention is not limited to the precise form of apparatus described and its method of operation, and that changes may be made therein without departing from the scope and spirit of the invention as defined in the appended claims.

The invention having been described, the following is claimed:

1. A conveyor system for transporting and sorting packages and other articles, comprising an elongated endless flexible carrier having a generally horizontal upper run and including a series of longitudinally spaced transfer members each supported for independent lateral movement, each of said transfer members including a follower supported for generally vertical movement along said upper run between an upper retracted position and a lower extended position, an upper track position for engaging each of said followers in said retracted position, a lower track disposed at a lower level than said upper track for engaging each of said followers in said extended position, one of said tracks diverting from the other said track for moving selected said transfer members laterally across said carrier for diverting an article from said carrier, and means for moving each of said followers between said retracted and extended positions.

2. A conveyor system as defined in claim 1 wherein each said follower comprises a roller supported by a shaft for rotation on a generally vertical axis along said upper run, and each of said transfer members includes means supporting the corresponding said shaft and roller for axial movement between said retracted and extended positions.

3. A conveyor system as defined in claim 2 and including a spring positioned for urging each of said shafts and corresponding said roller downwardly from said upper retracted position to said lower extended position.

4. A conveyor system as defined in claim 1 wherein said lower track curves away from said upper track and extends transversely across the path of said carrier.

5. A conveyor system as defined in claim 1 and including a ramp member disposed for moving each said follower from said extended position to said retracted position, and a releasable latch carried by each of said transfer members for retaining the corresponding said follower in said retracted position.

6. A conveyor system as defined in claim 1 wherein each said transfer member includes means for releasably retaining the corresponding said follower in said upper retracted position.

7. A conveyor system as defined in claim 6 and including a remotely controllable actuator positioned adjacent the path of said carrier for engaging said retaining means of said transfer members.

8. A conveyor system for transporting and sorting packages and other articles, comprising an elongated endless flexible carrier having a generally horizontal upper run and including longitudinally spaced parallel cross members supporting a series of transfer members for independent lateral movement, each of said transfer members on said upper run including a follower supported for generally vertical movement between an upper retracted position and a lower extended position, an upper track position for engaging each of said followers in said retracted position, a lower track disposed under said upper track for engaging each of said followers in said extended position, said lower track curving away from said upper track and extending transversely across the path of said carrier for moving selected said transfer members laterally across said carrier for diverting an article from said carrier, means on each said transfer member for releasable retaining the corresponding said follower in its retracted position, means for moving each of said follower between said retracted and extended positions, and activator means located adjacent the path of said carrier for releasing said retaining means on a series of selected said transfer members.

9. A conveyor system as defined in claim 8 wherein each said follower comprises a roller supported by a corresponding shaft for rotation on a generally vertical axis.

10. A conveyor system as defined in claim 8 and including a spring positioned for urging each of said followers downwardly from said upper retracted position to said lower extended position.

11. A conveyor system as defined in claim 8 and including a ramp member located at the end of said upper run of said carrier for successively moving each of said followers from said extended position to said retracted position.

12. A conveyor system as defined in claim 1 and including a remotely controllable actuator positioned adjacent the path of said carrier for successively engaging said retaining means on said transfer members.

13. A conveyor system for transporting and sorting packages and other articles, comprising an elongated endless flexible carrier having a generally horizontal upper run and including longitudinally spaced parallel cross members supporting a series of transfer members for independent lateral movement, each of said transfer members on said upper run including a shaft supported for generally vertical movement between an upper retracted position and a lower extended position, a roller mounted on said shaft of each said transfer member, an upper track position for engaging each of said rollers in said retracted position, a lower track disposed under said upper track for engaging each of said rollers in said extended position, said lower track curving away from said upper track and extending transversely across the path of said carrier for moving selected said transfer members laterally across said carrier for diverting an article from said carrier, latch means on each said transfer member for releasable retaining each of said shafts in its retracted position, spring means for urging each of said shafts from said retracted position to said extended position, and means located adjacent the path of said carrier for releasing said latch means on a series of said transfer members to permit said spring means to move said shafts and corresponding said rollers to said extended positions.

14. A conveyor system as defined in claim 13 and including a ramp member located at the end of said upper run of said carrier for successively camming said shafts and the corresponding said rollers from said extended positions to said retracted positions.

15. A conveyor system as defined in claim 13 and including a remotely controllable actuator positioned adjacent the path of said carrier for successively engaging said latch means on said transfer members.

* * * * *